Patented July 27, 1937

2,088,143

UNITED STATES PATENT OFFICE 2,088,143

CONDENSATION PRODUCTS FROM AROMATIC AMINES AND FORMALDEHYDE AND PROCESS OF MAKING SAME

Theodor Sutter, Basel, Switzerland, assignor to firm Society of Chemical Industry in Basle, Basel, Switzerland No Drawing. Application June 3, 1935, Serial No. 24,776. In Switzerland June 9, 1934

4 Claims. (Cl. 260—130)

The present invention relates to nitrogenous condensation products of primary aromatic amines and formaldehyde. It comprises the process of manufacture thereof and the new products themselves.

As condensation products obtained from formaldehyde and primary aromatic amines, capable of splitting off formaldehyde, there are hitherto only known the methylene-bis-aniline $C_6H_5.NH.CH_2.NH.C_6H_5$ and the anhydroformaldehydeaniline $C_6H_5.N=CH_2$ and their homologues and polymers.

These compounds which contain ½ or 1 molecular proportion of formaldehyde respectively per 1 molecular proportion of the amine, wherein the formaldehyde has been bound to the aniline by the elimination of water are capable of splitting off their formaldehyde only in presence of water or of substances binding methylene groups, such as for instance phenol, elevated temperatures in any case being necessary for such reaction.

The present invention relates to the production of compounds essentially richer in formaldehyde and capable of yielding half their formaldehyde under quite mild conditions, by causing 1 molecular proportion of a primary aromatic amine to react on more than 2 molecular proportions of formaldehyde in the absence of an acid or in presence of a base, for example sodium carbonate, it being advantageous to allow the amine to drop into the formaldehyde which should be as concentrated as possible and stirred very vigorously. Preferably about 3 or more molecular proportions of formaldehyde are used for each molecular proportion of amine. By diluting the amine with solvents insoluble in water, such as benzene, ether or chlorinated hydrocarbon avoidance of secondary reactions is facilitated. For example, if aniline dissolved in twice its volume of benzene is added by drops to an excess of aqueous formaldehyde solution of 40 per cent. strength and, when the reaction is finished, the two layers are separated, the benzene layer contains practically all the condensation product which has been formed besides a little free formaldehyde, while the aqueous layer contains the unconsumed formaldehyde in technically pure form ready for further use. The benzene solution can be freed from uncombined formaldehyde by shaking with a cold solution of sodium sulfite. After freeing the solution from moisture, for example with anhydrous sodium sulfate, and evaporating the solvent, the new product remains as a thick syrup. The determination of free formaldehyde in the aqueous layer and in the benzene solution shows that 2 molecular proportions of formaldehyde for each molecular proportion of aniline are combined with the aniline. In accordance with this result, the yield corresponds with an attachment of 2 molecular proportions of formaldehyde to 1 molecular proportion of aniline, occurring without elimination of water. On standing in moist air or on heating above 40 to 50° C. the new compound gives up formaldehyde; on prolonged standing or more quickly when gently warmed to temperatures from 40 to 60° C., an aqueous alcoholic solution of the new condensation product decomposes into free formaldehyde, crystallized anhydroformaldehyde-aniline and water.

In dilute acid the compound dissolves in the cold to form a solution which is at first colorless but soon becomes yellow to orange owing to a rearrangement having occurred in the condensation product. From the general behavior it appears that the new compound is of the type

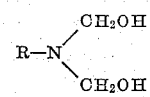

Such formulation would explain the fact that the substance, as stated above, gives up formaldehyde at moderate temperatures and under very mild conditions.

The new compounds made by this invention are useful as agents for yielding formaldehyde and as intermediate products, for example in the synthetic resin industry and in pharmacy. For their use as hardening agents it is particularly desirable that after the elimination of formaldehyde there should remain a colorless, solid and non-volatile substance, namely anhydroformaldehyde-aniline which then, as may be desired, can yield, at higher temperatures, its content of formaldehyde accompanied by liberation of aniline.

Instead of aniline its homologues, for instance o-, m- or p-toluidine, xylidines and the like, may be used yielding condensation products of quite similar properties.

The following examples illustrate the invention, the parts being by weight:—

Example 1

800 parts of a formaldehyde solution of 40 per cent. strength by volume are mixed with 5 parts of sodium carbonate and 300 parts of benzene and are dropped into the mixture, while vigorously stirring, 279 parts of aniline in 300 parts of benzene. The temperature of the mixture rises spontaneously to about 40° C. After the mixture has been stirred for several hours it is allowed to rest, the benzene layer is separated, shaken with excess of cold sodium sulfite solution and dried by means of potassium carbonate or anhydrous sodium sulfate; the benzene is then distilled in a vacuum at 30-40° C. By prolonged application of a high vacuum at 40° C. the syrup is freed from the last residue of benzene. There are obtained 430 parts of a clear, almost colorless syrup which becomes turbid on long standing. It dissolves freely in benzene forming a clear solution and more gradually in absolute alcohol, also forming a clear solution. When the clear solution in alcohol is mixed with water until it becomes turbid beautiful crystals of anhydroformaldehyde-aniline soon begin to separate, the corresponding quantity of formaldehyde becoming free.

*Example 2*

If in the foregoing example para-toluidine is used instead of aniline there is obtained in like manner per 1 molecular proportion of toluidine 160 grams of a wholly similar syrup which decomposes in aqueous alcohol into formaldehyde and anhydroformaldehyde-para-toluidine.

What I claim is:—

1. Process for the manufacture of nitrogenous condensation products of primary aromatic amines and formaldehyde containing substantially two molecular proportions of formaldehyde in combined form for each molecular proportion of the aromatic amine, which comprises causing 1 molecular proportion of aromatic amine to react on more than two molecular proportions of formaldehyde under neutral to alkaline reaction conditions and at temperatures not sensibly higher than 50° C. in presence of an organic solvent immiscible with water.

2. Process for the manufacture of nitrogenous condensation products of primary aromatic amines and formaldehyde containing substantially two molecular proportions of formaldehyde in combined form for each molecular proportion of the aromatic amine, which comprises causing 1 molecular proportion of aromatic amine to react on more than two molecular proportions of formaldehyde under neutral to alkaline reaction conditions and at temperatures not sensibly higher than 50° C. in presence of an organic solvent immiscible with water, separating the resultant two layers, and evaporating the organic solvent, containing the reaction product, from the non-aqueous layer at moderate temperature.

3. Process for the manufacture of nitrogenous condensation products of primary aromatic amines and formaldehyde containing substantially two molecular proportions of formaldehyde in combined form for each molecular proportion of the aromatic amine, which comprises causing 1 molecular proportion of aromatic amine to react on more than two molecular proportions of formaldehyde under neutral to alkaline reaction conditions and at temperatures not sensibly higher than 50° C. in presence of an organic solvent immiscible with water, separating the resultant two layers, and evaporating the organic solvent, containing the reaction product, from the non-aqueous layer at from 30-40° C.

4. The products formed without elimination of water from 2 molecular proportions of formaldehyde and 1 molecular proportion of a primary aromatic amine and obtained by causing 1 molecular proportion of aromatic amine to react on more than 2 molecular proportions of formaldehyde under neutral to alkaline reaction conditions and at temperatures not sensibly higher than 50° C. in presence of an organic solvent immiscible with water, said products forming sirupy masses which split off formaldehyde even at moderate temperature.

THEODOR SUTTER.